United States Patent [19]

Grady

[11] Patent Number: 5,000,592
[45] Date of Patent: Mar. 19, 1991

[54] ENVELOPE ADDRESSING FORMAT FEATURE FOR ELECTRONIC TYPEWRITERS

[75] Inventor: Charles R. Grady, Gaithersburg, Md.

[73] Assignee: International Business Machines Corporation, Armonk, N.Y.

[21] Appl. No.: 264,469

[22] Filed: Oct. 28, 1988

[51] Int. Cl.$^5$ .............................................. B41J 5/30
[52] U.S. Cl. ......................................... 400/68; 400/76
[58] Field of Search .................... 400/61, 68, 76, 625, 400/629

[56] References Cited

U.S. PATENT DOCUMENTS

| | | | |
|---|---|---|---|
| 4,085,445 | 4/1978 | Blevins | 400/68 |
| 4,473,314 | 9/1984 | Imaizumi | 400/629 |
| 4,540,299 | 9/1985 | Yamada | 400/708 |
| 4,564,302 | 1/1986 | Hatazawa | 400/76 |
| 4,604,696 | 8/1986 | Suganuma | 400/76 |
| 4,712,929 | 12/1987 | Kitaoka | 400/76 |
| 4,718,784 | 1/1988 | Drisko | 400/68 |

FOREIGN PATENT DOCUMENTS

| | | | |
|---|---|---|---|
| 140181 | 8/1982 | Japan | 400/708 |
| 9792 | 1/1985 | Japan | 400/208 |
| 0201973 | 10/1985 | Japan | 400/76 |
| 0041073 | 2/1987 | Japan | 400/76 |
| 2170934 | 8/1986 | United Kingdom | 400/708 |

OTHER PUBLICATIONS

IBM Technical Disclosure Bulletin, vol. 27, No. 9, Feb. 1985, p. 5112.

Primary Examiner—David A. Wiecking
Assistant Examiner—Steven S. Kelley
Attorney, Agent, or Firm—Laurence R. Letson

[57] ABSTRACT

A function is disclosed that permits the operator of a typewriter to properly position the return address, on arrival instructions, special mail instructions and the addressee name and address properly on predetermined standard sized envelopes by the typewriter. The function acts to position the print point at the first field and then to progress to the subsequent fields as desired by the operator keying a key such as the tab key to progress to the next field. The field locations are determined by the operator selection of the envelope size.

9 Claims, 3 Drawing Sheets

ENVELOPE ADDRESSING FORMAT FEATURE FOR ELECTRONIC TYPEWRITERS

This invention relates to the field of electronic typewriters and more specifically to operator controlled and invoked functions of the typewriters.

BACKGROUND OF THE INVENTION

With the proliferation of electronic typewriters, the typewriter has become a computer controlled printer with a keyboard input device. As long as the operations of the printer are capable of being broken down into the discrete operational steps of the printer, such as escapement, paper feed, tabulation, printing and carrier return, the computer may control the printer operation in ways that are very beneficial to the operator in that the operator is relieved of the need to memorize information or requirements for producing documents and correspondence that are not only correct but pleasing in appearance.

For example, envelopes have a predesignated position for each of the return address, addressee's name and address, on arrival directions and special mail service captions.

The positions of the different entries of course vary depending on the size of the envelope. The operator thus has to remember the relative positions for different envelope sizes. The remembering of the positions and the necessary keyboard manipulations diverts the typist's attention from the entries themselves and thus increases the chances for error.

SUMMARY OF THE INVENTION

The subject invention is a function on the typewriter, incorporated into the computer controls to cause the operation of the printer, and in particular, the escapement and line and/or paper feed operations of the printer to be operated automatically in response to the invocation of the function from the keyboard by the operator, and the subsequent operation of the tabulation key or other designated key, to position the print mechanism at the predetermined position relative to the envelope.

The positions for the different entries on the envelopes are stored in the memory of the typewriter for each size of envelope. The operator invokes the function and then selects the envelope size. The electronic controls of the typewriter then position the print mechanism at the proper line position for the return address and relinquish control to the keyboard for the typing of the return address entry. Thereupon, the operator would enter the name, address or other information to occupy that position. Thereafter, when the operator depresses the tabulation key or other predesignated key or keys, the print point is moved to the position of the next entry for the envelope size selected, without regard to the tabulation stops stored in the typewriter memory for controlling the movement of the print mechanism with regard to the typing of normal text.

Upon arrival of the print mechanism at the next position, the process is repeated until the operator is finished with the envelope and the function is turned off.

A better understanding of the invention may be had from the drawings and the description of the invention to follow.

DESCRIPTION OF THE INVENTION

For at least the two most commonly used sizes of business envelopes, the positions of the return address, addressee name and address, on arrival directions and special mail service instructions are defined by convention. The return address position begins on line 3 and indented 5 spaces from the left edge of the envelope for both the No. 6 ¾ and No. 10 envelopes.

The on arrival directions are positioned, by convention, on the 9th line with the left end aligned with the left of the return address.

While the Special Mail service instructions should be positioned in the upper right corner on line 9 and ending about 5 spaces from the right edge of the envelope, the position can be defined as starting at a position 21 to 25 spaces from the right edge of the envelope.

The addressee's name and address is positioned conventionally on line 12 and two inches from the left edge of a small (No. 6 ¾ or C7/6 metric size) envelope. For a letter size (No. 10 or its metric equivalent DL) envelope, the addressee's name and address is positioned four inches from the left edge and on line 14.

With sets of parameters corresponding to these locations, referred to as envelope fields, stored in the memory 32 of an electronic typewriter 10, at the time of its manufacture, or by loading from diskette, if the typewriter 10 has that capability, and available to the microprocessor controlling and operating the typewriter 10, the typewriter 10 may be programmed to perform the envelope function under operator control and with operator interaction.

The invention is implemented in its preferred embodiment as a program of computer control instructions written for and controlling the microprocessor of the electronic typewriter 10. The specific program instructions will depend on the specific microprocessor and may be written by one of skill in the art of programming using the teaching of the invention and the flow diagrams herein.

Figure 1:
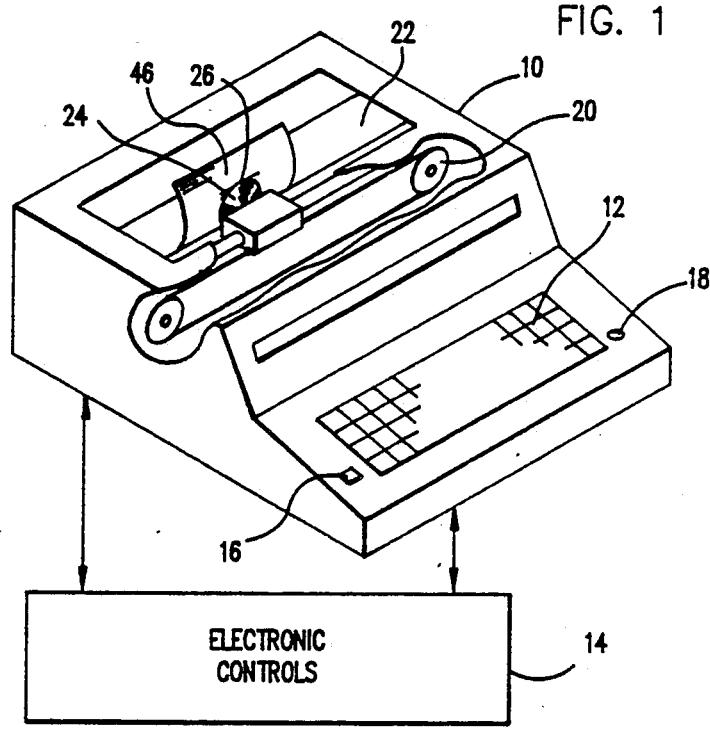
FIG. 1 shows a typewriter with the electronic controls depicted attached to the keyboard and the printer.

Referring to FIG. 1, the typewriter 10 is illustrated with a keyboard 12 for inputting signals to the electronic controls 14. The keyboard 12 includes a key which may be designated the envelope key 16. Alternatively, the envelope key 16 may be supplanted with a combination of a code key and another non-dedicated key on the keyboard 12 if desired for any reason. Such control key combinations are conventional on typewriter keyboards. Also provided on the typewriter 10 at a convenient location, is a light 18 which may be illuminated when the envelope function is activated. The printer 44 portion of the typewriter 10 comprises an escapement drive 20, a paper feed 22 and a print mechanism 24. The print mechanism 24 and the paper feed 22 cooperate to define the print point 26 where printing occurs.

Figure 2:
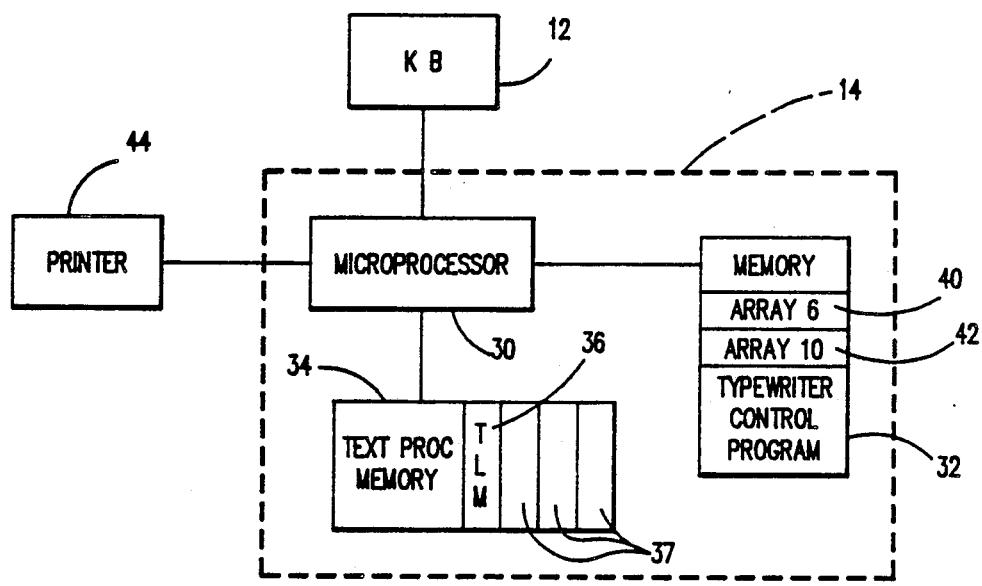
FIG. 2 illustrates the architecture of the system.

FIG. 2 shows the architecture of the system in block diagram form. Electronic controls 14 include for the purposes of this description a microprocessor 30 and a memory 32 which contains, among other code, the control program for the typewriter 10 and for the function.

Additionally, the electronic controls section 14 has a memory 34 to which information may be written by the microprocessor 30 such as stored text, typewriter parameters, pointers, transient values and the value of the temporary left margin position. This may be stored in the TLM buffer 36. The microprocessor 30 may access the value stored in the TLM buffer 36 when commanded by the control program stored in the memory 32. Memory 32 also stores the necessary data for defining the field arrays for the envelopes 46. This is shown, for example, as array 6 and array 10 and designated by reference numerals 40 and 42, respectively.

The microprocessor 30 is interconnected with keyboard 16 and printer 44. Microprocessor 30 receives the inputs from the keyboard and operates on them under the control of the program stored in memory 32 as is conventional. The microprocessor 30 then sends the appropriate output signals to the printer 44 to cause the mechanical operations necessary to accomplish the marking on an envelope 46, and other operations such as escapement and line feed.

Figure 3A:
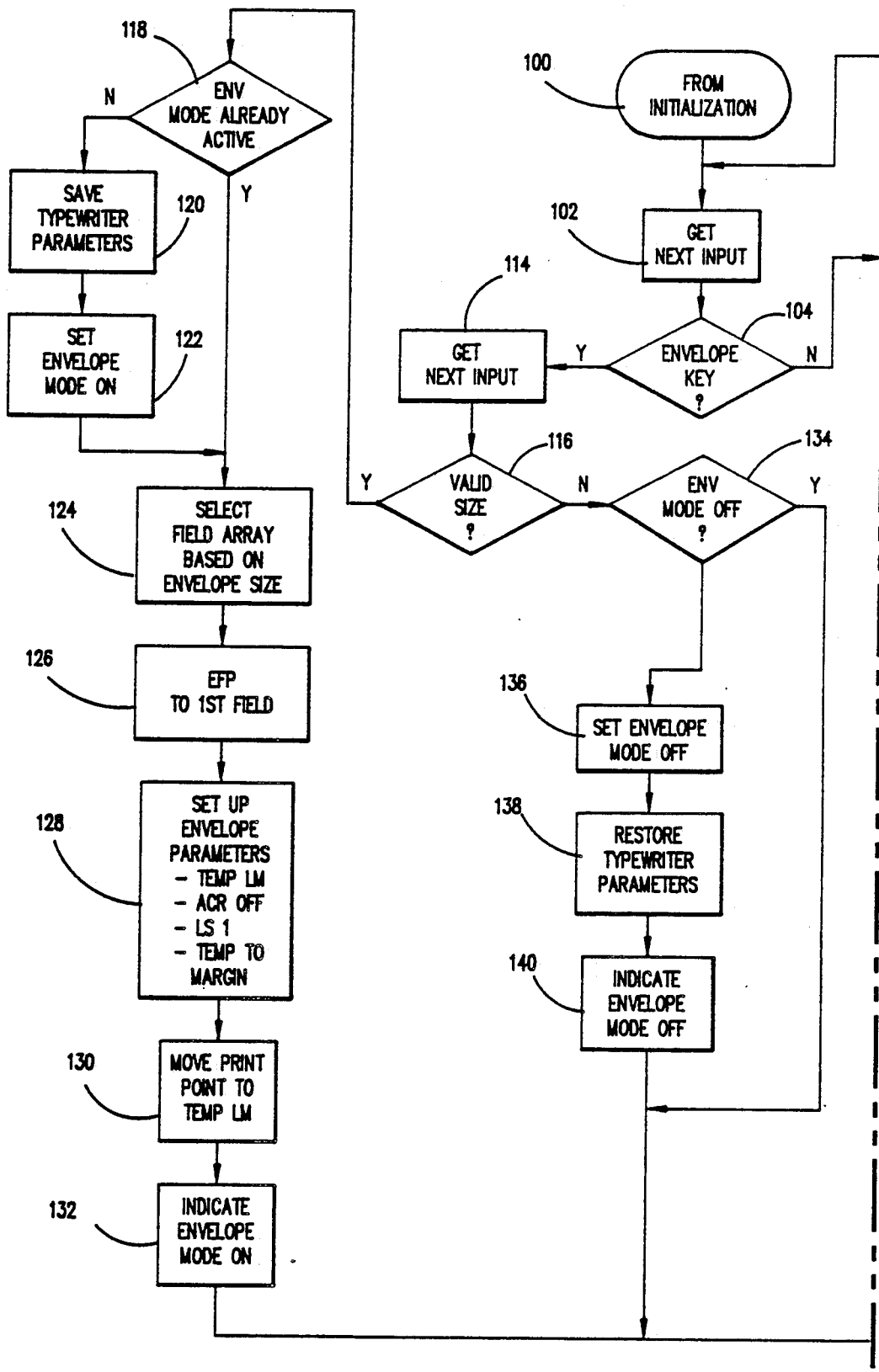
FIGS. 3A and 3B are a flow diagram illustrating the logic sequence of operations that the system performs in controlling the typewriter.
Figure 3B:
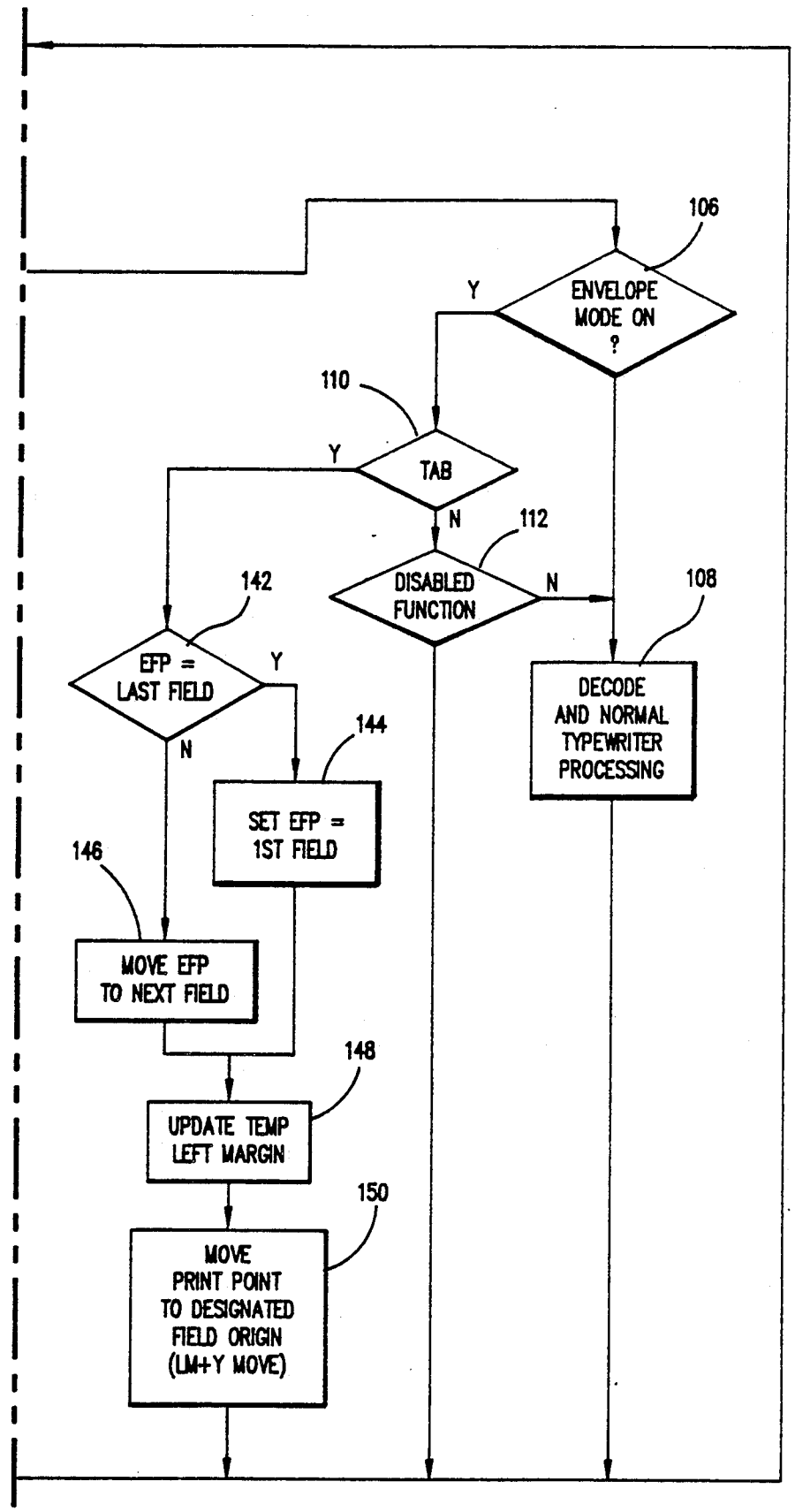

Referring to FIGS. 3A and 3B, the flow diagram representing the operations of the microprocessor 30 under program control, is set forth. It is assumed that the typewriter 10 is operational and functioning as a typewriter and is idling or waiting for a signal from the keyboard 16.

The state of the typewriter while idling is represented by reference numeral 100 in FIG. 3. The typewriter in its idle mode is constantly seeking the next input, such as a key stroke. When a keystroke is input, the system gets the next input as in operation 102.

When an input is received, it is tested, in operation 104, to determine if it represents the key 16 used to initiate the envelope function. If the determination is that the input is not the envelope key 16, then the status of the typewriter 10 is checked in operation 106 to determine if the envelope mode is already turned on. If that determination is negative, then the input may be decoded and processed normally, in operation 108, and the typewriter caused to function in accord with that input, such as print a character, space, line feed, carrier return or any other operation. Thereafter the flow loops back to operation 102.

This preceding description explains the sequence of events for the typewriter 10 when the typewriter 10 is operating in the normal mode of a typewriter.

Should the input be determined to be the envelope mode key 16 input in operation 104, the flow is then to operation 114 where the next input from the keyboard 12 is acquired and the input is then tested in operation 116 to determine if the just acquired input is an input representing a valid size indicator for the envelope. Valid size indications may be defined as numbers such as 6 and 1 or 0, indicating a No. 6 ¾ or No. 10 envelope, respectively. Other possible indicators could include the letters "S" or "L" as indicating small and large envelopes, respectively.

When a valid size is detected in operation 116, the flow of control branches to operation 118 where the status of the typewriter 10 is checked to determine if the envelope mode of operation is already on or active. If the envelope mode is not already on, then the typewriter 10 has just received commands that would activate the function. The branching of the flow to operation 120 initiates the step of saving in memory 34 the typewriter parameters, such as the margin settings, the tab stop settings, the indicator for automatic carrier return status, the line spacing selection and the temporary left margin value. These parameters will be needed when the envelope function is turned off or exited and the typewriter 10 returned to normal duty.

After the parameters are saved, the envelope mode is turned on or activated in operation 122.

The flow from operation 122 and from operation 118 when the envelope function is already active, is to operation 124 where the field array 40, 42 is selected based on the size indication decoded in operation 116. The field array 40, 42 comprises the stored values of the X and Y locations of the fields into which the operator may enter names, addresses, and other instructions. These locations are then used in the temporary left margin operation and the vertical moves necessary to properly position the print point 26 of the typewriter 10 for printing in the different fields.

The appropriate field array of the field arrays 40, 42 is selected and retrieved from memory 32 and then stored in the buffers 37 of working memory 34 of the typewriter 10, which consist of several buffers for temporarily storing working parameters. Alternatively, pointers can be set within the microprocessor 30 to indicate which of the arrays 40, 42 is selected and which may be retrieved by the microprocessor 30 as needed during the operation of the system.

In operation 126, a pointer, the envelope field pointer referred to as EFP is set to indicate the first of the fields in the selected field array 40 or 42 so that as the microprocessor 30 functions and needs positional data, it will access the positional data for the field indicated as the current or active field. The next operation, 128, sets up the envelope parameters for the size envelope selected in operation 116 and loads those parameters into retrievable storage locations 37. Those parameters affect the operations of other well known and existing functions of the typewriter such as temporary left margin, line spacing, paper insertion with a defined top margin and the turning off of the automatic carrier return. These operations all exist on typewriters in the market place and may be exemplified by the IBM WHEELWRITER family of typewriters sold by IBM Corporation, Armonk, N.Y.

After the parameters are set up as in operation 128, operation 130 causes the print point to be moved to the temporary left margin as defined by the X position of the field currently being used as loaded or set up in operation 128. Thereupon, the typewriter 10 will indicate to the operator that the envelope function is operative as in operation 132. This indication may take the form of lighting an indicator light 18 or the sounding of a buzzer or the print wheel of the typewriter being spun without any character selection taking place. Any of these or other similar attention getting actions may be used to alert the operator to the fact that the envelope function is ready to proceed.

With the turning on of the envelope function in operations 120 through 132, the typewriter 10 is ready to process the inputs received by the typewriter to either type information or to react to the input in accord with the envelope functional inputs.

The next input is retrieved from the input source in operation 102. This input may be a paper insertion command for inserting the envelope in accord with the temporary top margin value set in operation 128 to position the print point at the third line of the envelope.

Alternatively, the next input may be a character or tabulation command. In any event, if the input is not the envelope key, then operation 104 will direct the flow to operation 106 and thence to operation 110. If the input was a paper insertion command or a character selection and print input, the flow would be from operation 110 through operation 112, where the input is tested to determine if it is a function command that has been disabled, and if not, then to operation 108 and return. When the envelope function is activated, certain functions of the typewriter, such as tab set, don't function as they would normally and are disabled. If the input is a disabled function, then the input is ignored and the flow is directed from operation 112 back to operation 102.

However, if the command is a tabulation command the flow branches at operation 110 to operation 142 where the determination is made whether the envelope field pointer, hereinafter EFP, is pointing to the last sequential field of the selected field array. If the EFP is pointing to the last field of the array, then the tab command causes the EFP to be set to point to the first sequential field of the field array in operation 144. This prepares the typewriter to handle a new envelope of the same size.

When the tab command is detected in operation 110 and the EFP is set to indicate other than the last sequential field of the array, then the EFP is set to indicate the next sequential field in the array in operation 146. This allows the operator to indicate, by pressing the tab key or other designated key or combination of keys, when it is desired to progress to the next field. This routine also allows the operator to sequence through the fields that are not needed by repeated tab commands.

With the setting of the EFP to the next field, the new field may require a different left margin than the previous field. Accordingly, in operation, the left margin associated with the new field indicated by the EFP is loaded into the temporary left margin buffer or is indicated as the active value by a pointer, both approaches being conventional. This selecting and activating of the left margin value is accomplished in operation 148.

Once the temporary left margin is set to the new position as selected by the EFP designating the field that is active, the print point 26 is moved to the left margin position and the Y position of the new field is accessed, based upon which field is designated. The Y position may be retrieved from the storage location of the field array 40, 42 selected and when compared with the existing position of the print point, the delta distance determined. With this distance determined, the movement of the print point is controlled by moving the envelope 46.

The vertical movement capability exists on the IBM WHEELWRITER 50 and 70 typewriters sold by IBM Corporation, Armonk, N.Y. This capability is incorporated in the Mark Function. The Mark Function allows the operator to designate positions relative to the page and can jump directly to those positions without commanding intervening line feed and carrier return operations. In the Mark Function the marked locations are operator designatable.

After the print point is moved to the new field location, the flow is looped back to the point where the typewriter 10 is idling and awaiting the next input, at operation 102.

Referring back to operation 116, if the input tested is not an indicator of a valid envelope size, then the machine status is checked to see if the envelope mode is turned off. If the envelope mode is turned off, then the control logic flow loops back to await the next keyboard input since the entering the envelope mode requires not only the entry of the envelope mode but must also be followed by a valid size selection.

In the event that the input tested is not a valid size selection and the envelope mode is currently not off, but rather active, then the signal from the envelope mode key 16 without the size indicator results in the exiting from or the turning off the envelope mode. This determination occurs in operation 134.

The step of turning off the envelope function is operation 136. With the envelope function turned off, the typewriter is ready to return to the normal operations of a typewriter and will require the reinstatement of the normal operating parameters for typewriter operation. Thus, after the envelope function is turned off in operation 136, the typewriter parameters that were stored away in memory 34 in operation 120 are retrieved and restored to operational control in operation 138.

To complete the exiting of the envelope function, the typewriter 10 will indicate that the envelope function has been turned off with an action similar to that used in operation 132 to indicate the turning on of the function, in operation 140.

From the foregoing discussion, it can be seen that the envelope function combines the advantages of the typewriter operation in its normal mode of typing and printing with the ability of selecting one of several field arrays that are associated with envelopes of standard sizes. The operator may then move directly from one field of data to another on the envelope and enter the typed matter as desired, efficiently by using the tab key to move directly to the next field. Upon arrival at the field location, the typewriter 10 reverts to the normal typing and printing operations to record the keyboarded inputs, until commanded to proceed to the next field.

This envelope function allows the operator to rapidly and efficiently progress through the data fields of an envelope 46 accurately in the preparation of the envelope.

The choice of particular keys to control specific operations of the envelope function is arbitrary and left to the choice of the implementer, to accommodate human factors needs.

While the microprocessor utilized in the preferred embodiment is an Intel 80XX, it is recognized that any comparable commercially available microprocessor may be used. The exact code written to control the microprocessor may be written from the flow diagram in FIGS. 3A and 3B, the knowledge of the envelope function as described herein and the knowledge of the requirements of the microprocessor furnished by its manufacturer, by one of ordinary skill in the art of programming.

We claim:

1. A typewriter having an envelope function, comprising a print mechanism, a keyboard for input, paper feed for positioning paper in said typewriter and feeding it in response to operator commands, an escapement drive for positioning a print mechanism relative to said envelope and electronic controls for controlling said print mechanism, escapement drive and paper feed in response to inputs provided to said controls from said keyboard, said electronic controls comprising;

memory means for storing predesignated arrays of
      data fields for envelopes of predesignated sizes, said arrays comprising data representing the locations of said data fields relative to said envelopes;

keyboard controlled means for selecting one of said predesignated arrays of data fields in response to operator input of a predefined envelope size designation;

means for positioning said print mechanism in accord with said selected array of data fields at a first data field position relative to said envelope;

keyboard controlled means for sequentially selecting data fields of said array;

means for positioning said print mechanism at sequential data fields of said preselected array responsive to said means for sequentially selecting;

said print mechanism responsive to said keyboard and said electronic controls for printing operator supplied data from said keyboard in said data fields on said envelope.

2. The typewriter of claim 1 wherein said means for selecting further comprises means for retrieving and storing a value representative of the left edge of a data field.

3. The typewriter of claim 2 wherein said means for sequentially selecting further comprises means for retrieving and storing a value representative of the left edge of said sequentially selected data field.

4. The typewriter of claim 3 wherein said means for sequentially selecting further comprises an operator input means in the form of a tab key.

5. The typewriter of claim 1 further comprising keyboard input key means for indicating to said electronic control means that the function is to be activated.

6. The typewriter of claim 1 further comprising means to preserve typewriter control parameters when said function is activated and to retrieve from said memory means parameters designated for the operation of said function.

7. The typewriter of claim 1 wherein said means for selecting further comprises means for indicating a value representative of the left edge of a data field.

8. The typewriter of claim 2 wherein said means for sequentially selecting further comprises means for indicating a value representative of the left edge of said sequentially selected data field.

9. The typewriter of claim 1 further comprising means perceptible by an operator for indicating operability of said envelope function.

* * * * *